No. 855,629. PATENTED JUNE 4, 1907.
O. O. GOSERUD & O. GOSERUD, Jr.
ROTARY ENGINE.
APPLICATION FILED APR. 18, 1905. RENEWED DEC. 5, 1906.
3 SHEETS—SHEET 1.
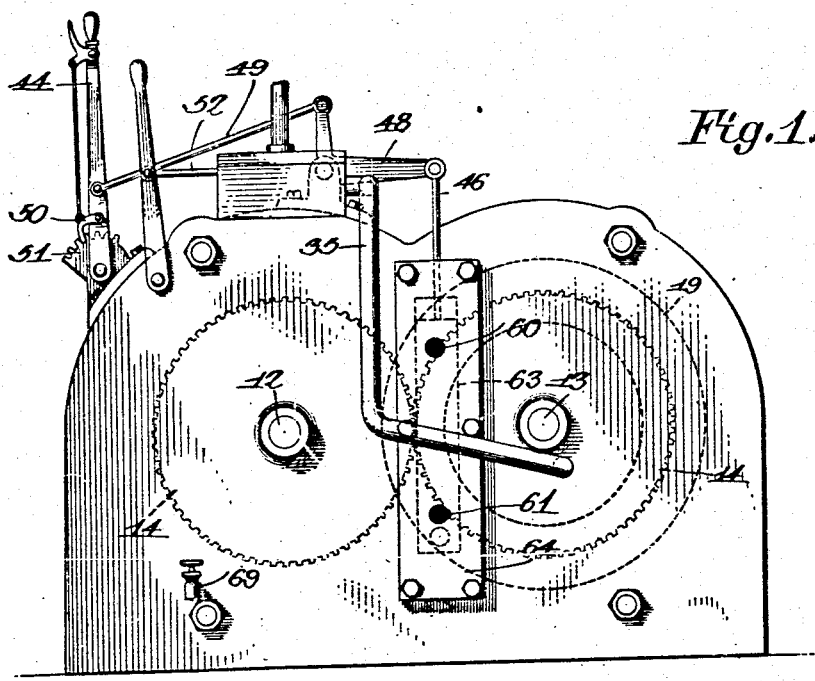
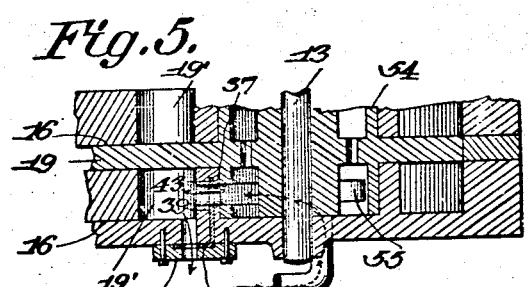
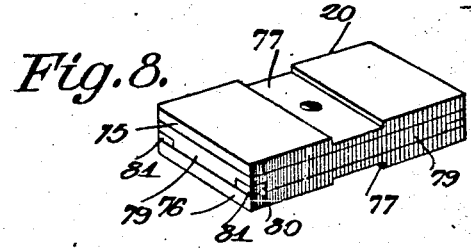
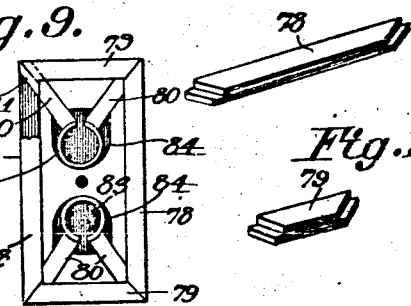
Witnesses
Ole O. Goserud & Ole Goserud Jr. Inventors,
by C. A. Snow & Co.
Attorneys No. 855,629. PATENTED JUNE 4, 1907.
O. O. GOSERUD & O. GOSERUD, Jr.
ROTARY ENGINE.
APPLICATION FILED APR. 18, 1905. RENEWED DEC. 5, 1906.
3 SHEETS—SHEET 2.
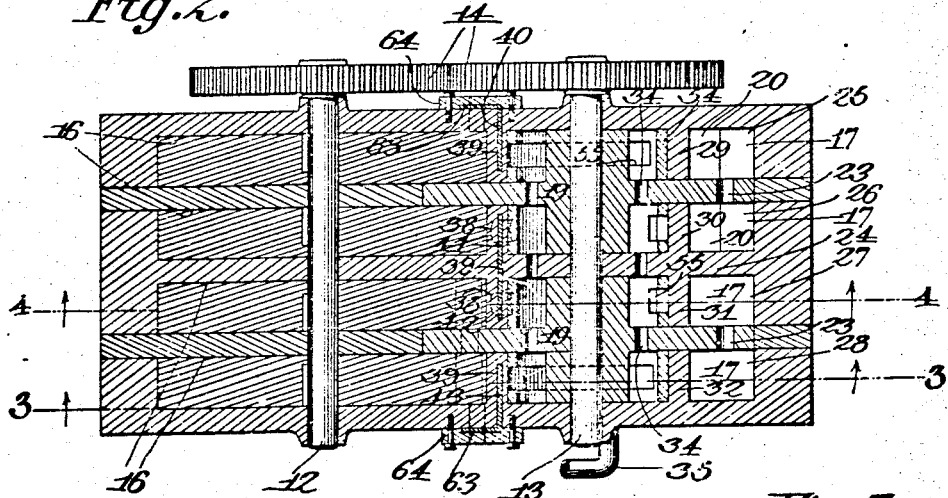
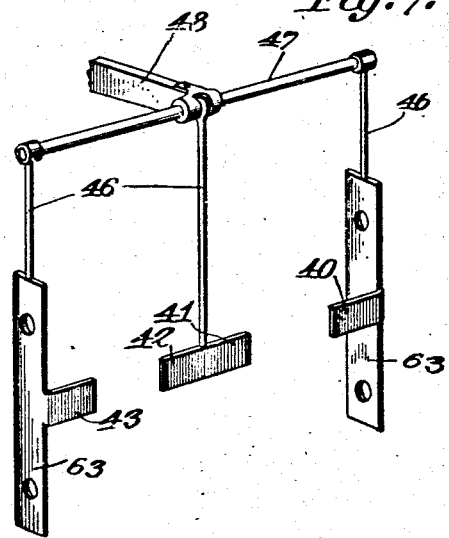
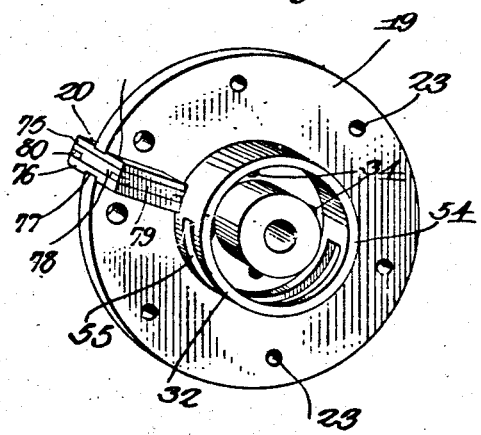

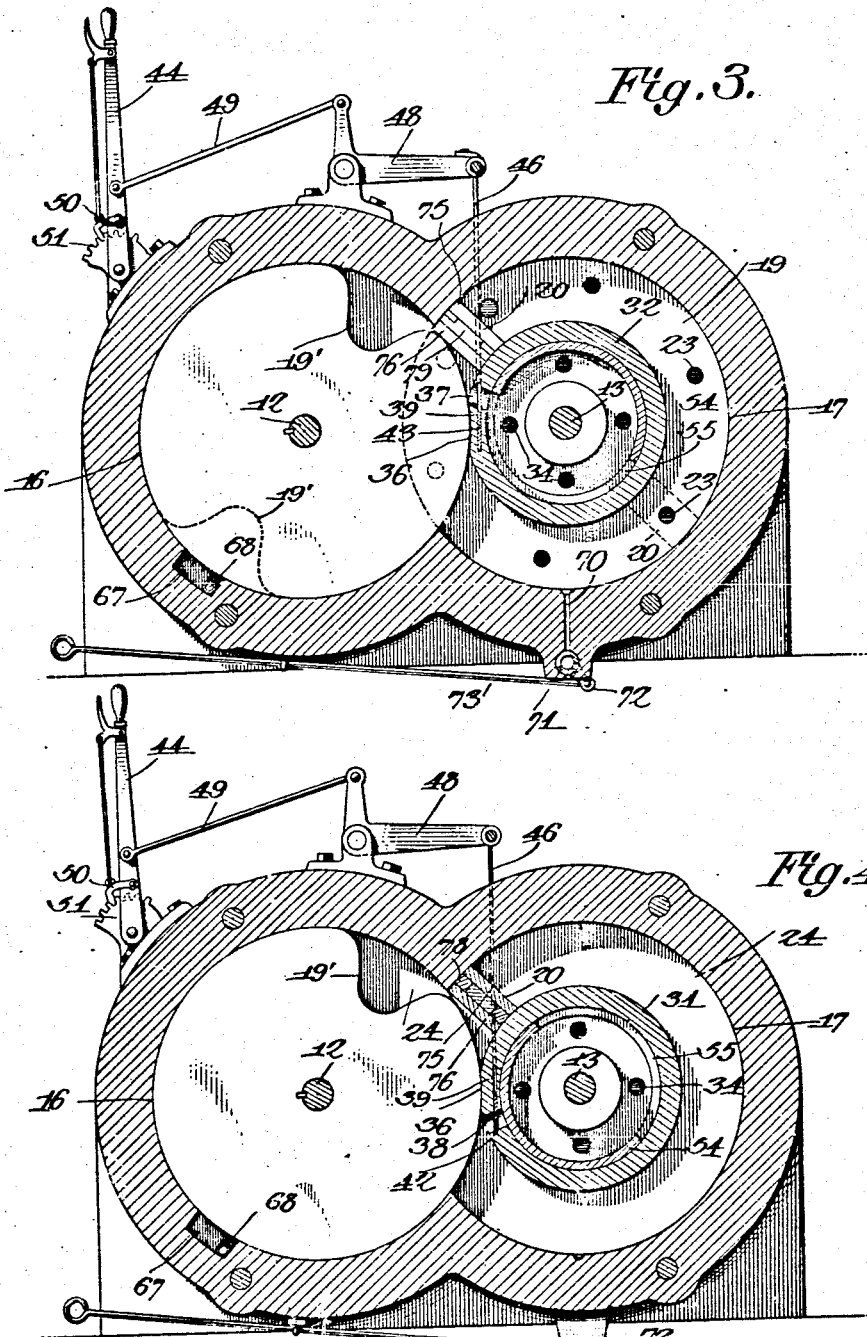

UNITED STATES PATENT OFFICE.

OLE OLSEN GOSERUD AND OLE GOSERUD, JR., OF SUMMIT, SOUTH DAKOTA.

ROTARY ENGINE.

No. 855,629.  Specification of Letters Patent.  Patented June 4, 1907.

Application filed April 18, 1905. Renewed December 5, 1906. Serial No. 346,485.

*To all whom it may concern:*

Be it known that we, OLE OLSEN GOSERUD and OLE GOSERUD, Jr., citizens of the United States, residing at Summit, in the county of Roberts and State of South Dakota, have invented a new and useful Rotary Engine, of which the following is a specification.

This invention relates to rotary engines, and has or its principal object to provide a novel form of multiple cylinder engine that may be revolved in either direction, the several cylinders of the engine being provided with valves that are connected to a single reversing lever to permit their simultaneous operation.

A further object of the invention is to provide a multiple cylinder engine with a single steam chest extending through all of the cylinders and from which all of said cylinders are supplied with steam or other fluid under pressure.

A still further object of the invention is to provide for the balancing of the abutments by fluid pressure in order to lessen frictional resistance.

A still further object of the invention is to provide a novel form of piston carrying a suitable cut off valve having a port of any desired length in accordance with the work for which the engine is intended, so that steam pressure may be supplied throughout any portion of the stroke.

A still further object of the invention is to provide a novel form of piston wing and piston wing packing for the purpose of preventing any leakage of steam.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a rotary engine constructed in accordance with the invention. Fig. 2 is a sectional plan view of the same. Fig. 3 is a vertical sectional view of the engine on the line 3—3 of Fig. 2. Fig. 4 is a similar view on the line 4—4 of Fig. 2. Fig. 5 is a detail sectional view illustrating principally the arrangement of the steam inlet port and one of the escape ports. Fig. 6 is a detail perspective view of one of the duplex pistons. Fig. 7 is a similar view showing the reversing valves. Fig. 8 is a detail perspective view of one of the duplex piston wings detached. Fig. 9 is a plan view of the same partly in section. Figs. 10, 11 and 12 are detail views of portions of the piston wing packing members detached.

Similar numerals of reference are employed to indicate corresponding parts throughout the several figures of the drawings.

The frame or casing of the engine is divided into a number of separate engines, four being illustrated in the present instance, and each including a revoluble piston member, and a revoluble abutment, the several abutments being keyed to a shaft 12, while the piston members are secured to a shaft 13, the two shafts being connected for mutual movement by gears 14 of the same diameter.

The abutment chambers 16 and the steam chambers 17 are circular in form and intersect, so that a piston member may pass into the abutment chamber during a portion of its revolution, while a portion of the revoluble abutment is at all times projecting into the steam cylinder.

The pistons, as will appear more clearly on reference to Fig. 6, are in the form of disks 19 having radially arranged duplex piston wings 20 of the character shown in Figs. 8 and 9, the opposite ends of each piston wing extending into adjacent steam cylinders and the corresponding abutments being provided with piston wing receiving recesses 19' that register with and permit the passage of the piston wing ends during each revolution, and the shape of these recesses is preferably such that there will be continuous, or practically continuous, contact between the outer edge of the piston wing and the wall of the recess during this portion of the stroke.

The piston disks 19 serve as division members between adjacent steam cylinders, and they are provided with a large number of ports 23 to permit free communication between adjacent steam cylinders.

The cylinders are divided into pairs by a central vertically disposed partition 24, there being a pair of communicating cylinders 25 and 26 on one side the partition, and a pair of communicating cylinders 27 and 28 on the opposite side of the partition, and in these cylinders are annular ribs 29, 30, 31 and 32, respectively, said ribs being preferably formed integral with portions of the casing and forming in connection with the circular inner wall of the cylinder an annular steam space on which the piston wing may travel.

The vertical partition 24 and both of the piston disks 19 are provided with openings 34 arranged within the lines of the annular ribs, so that steam admitted through the pipe 35 will pass to the interior of all of said ribs, thereby forming a continuous steam chest within all of the cylinders. The ribs are stationary and are slightly concaved, as at 36, Fig. 3, to receive the periphery of a revoluble abutment, the joint being steam tight, and packing being employed at this point in order to prevent the passage of steam. The two outer cylinders 25 and 28 work in pairs, and the ribs 29 and 32 of these cylinders are each provided with a steam port 37 to admit steam from the steam chest to the steam space at a point above the point of contact of the ribs and abutment, while the inner cylinders 26 and 27 also work in pairs, and their ribs are provided with steam ports 38 at points below the meeting lines of the abutments and ribs.

In each rib is a vertical slot 39 for the reception of a reversing valve, there being four of such valves, 40, 41, 42 and 43, all connected for mutual movement to a reversing lever 44, and when moved to one position, the ports 37 will be opened to revolve the pistons in the direction indicated by the arrow in Fig. 3. When moved to the opposite position, the ports 38 will be opened, and the pistons will revolve in the direction indicated by the arrow in Fig. 4. The several valves are connected by rods 46 to a transversely extending bar 47 that is carried by one arm of a bell crank lever 48 fulcrumed at the top of the engine. The opposite end of the bell crank lever is connected by a link 49 to the reversing lever 44, and the latter carries a latch 50 which may be locked in a segment 51 of the usual type for the purpose of adjusting and locking the valves in order to govern the quantity of steam passing through the ports, although this in all cases will not be necessary, inasmuch as steam may be governed by a throttle valve 52 coupled in the steam inlet pipe 35.

From each side of each of the pistons projects a cut off valve in the form of an annular flange 54 that is provided with an elongated port 55, which in traveling over the steam port formed in the rib will permit the flow of steam from the steam chest to the annular steam chest, and the length of this port 55 governs the quantity of steam admitted to the engine, or rather the time during which steam is admitted, so that the piston may be worked under full pressure, or the steam may be cut off early in the stroke and used expansively.

In the opposite heads of the engine are formed exhaust ports two of which are indicated at 60 and 61 in Fig. 1, and said ports are under the control of slide valves 63 that are carried by and moved with the reversing valves. These valves are guided within suitable recessed plates 64 bolted to the cylinder heads, and, when raised, the upper port 60 will be opened and when the valve is lowered port 60 will be closed and the port 61 will be opened. The ports are the same in both ends and the two upper ports are always opened, or the two lower ports are opened.

The duplex piston wings of the two piston disks are disposed, respectively, at diametrically opposite points, that is to say, the wing fitting in the cylinders 27 and 28 is shown in the full lines in Figs. 3 and 5, while the corresponding wing of pistons 25 and 26 is in the position indicated by dotted lines in said figures, and the cut off valves carried by the disks are correspondingly arranged.

The abutments are all of the same type, being merely in the form of circular disks, and their recesses are disposed in positions to correspond to the positions of the piston wings, that is to say, the recesses 19 of the abutments protruding in the cylinders 27 and 28 will be in a position illustrated in full lines in Figs. 3 and 4, while the corresponding abutments fitting in chambers 25 and 26 will have their recesses at the points indicated by dotted lines in said figures.

In order to partly balance the weight of the abutments and reduce friction, steam pockets 67 are arranged in the lower portions of the walls of the abutment chamber, and these serve in a measure to raise the abutments and to prevent unnecessary friction. All of the steam ports are placed in communication with each other by ports 68, and at one side of the engine is a pet cock 69 through which water of condensation may be withdrawn from time to time. In order to drain the cylinders, each cylinder has an outlet port 70 under the control of a valve 71, the latter being connected by a rocker arm 72 to an operating rod 73. By moving this rod in the direction of its length, the ports may be opened for the purpose of drawing off water of condensation.

Each of the pistons 20 is formed of a pair of rectangular plates 75 and 76 that are provided with centrally disposed recesses 77 to receive the edge walls of radial slots formed in the piston disks for the purpose, and these plates may be fastened together by bolts or screws. The plates are provided with grooves all around their outer edges, and in these grooves are arranged packing strips 78 and 79, the opposite ends of each strip being mitered and flanged as shown in Figs. 10 and 11. The plates are further provided with diagonally disposed cutting recesses for the reception of packing members 80 that have end flanges or loops 81 for the reception of the end flanges of the packing strips. The inner ends of these packing members rest against small springs 83 arranged in recesses 84 in the piston wings, said springs being shown in the present instance in the form of open rings having an expansive tendency, so that the packing members 80 will be forced outward and will tend to expand all of the packing strips and move the latter into engagement with the vertical and curved walls of the annular steam space.

In the operation of the engine, steam is admitted through the pipe 35 to the interior of the annular rib 32, and from thence passes through the several openings 34 to the interior of the annular ribs and the four steam cylinders. The reversing lever is then moved to open either the ports 37 or the ports 38 and close the other ports. If the ports 37 are open, the upper escape port 60 will be closed, and the port 61 will be open. If the parts then be in the position illustrated in Fig. 3, steam will pass through the port 37 and will act on the revoluble abutment, and the piston wing and effect movement of the latter in the direction indicated by the arrow, and any dead steam in advance of the wing will escape through the port 61. This operation will continue until the edge of the elongated port of the cut off valve closes the port 37, this in the present case occurring at about half stroke, and the steam acting expansively thereafter. This of course may be altered in accordance with the purpose for which the engine is intended, or the valve itself may be made adjustable if desired. The steam entering the cylinder 28 between the abutment and the piston wing will pass through the openings 23 into the space between the second abutment and the piston wing in cylinder 27, and will operate also in the second cylinder, while the escape passes in the opposite direction from cylinder 27 to the openings 23 in advance of the piston wings, and thence from the cylinder 28 through the escape port 61. At the same time steam will pass from the chest through the port 37 of rib 29 in cylinder 25, and will operate on the piston wing in said cylinder, and a portion of this steam will pass through the openings 23 of the piston disk to the cylinder 26 and operate on that portion of the piston wing projecting from said cylinder, so that all four of the cylinders will be operated.

To reverse the engine, it is merely necessary to raise the bar 47 by means of the reversing lever, whereupon the two ports 37 will be closed and the port 38 will be opened. By the same movement, the upper escape port 60 will be opened and the lower port 61 will be closed. The two cylinders 26 and 27 will then come into operation and start the movement of the pistons in the reverse direction, or the direction indicated by the arrow in Fig. 4, and a portion of the quantity of steam admitted to said cylinders will pass to the outer cylinders 25 and 28, the operation being the same as before described.

Having thus described the invention, what is claimed is:—

1. In a rotary engine, a pair of cylinders arranged side by side and having communicating steam chests, a piston disk separating the two cylinders and provided with steam passages, a piston wing having portions projecting into said cylinders, abutments coacting with the pistons, steam ports for the admission of steam from the chests to the cylinders, the port of one cylinder being on one side of the active face of said abutment, and the port of the second cylinder being on the opposite side, and valves for controlling said ports.

2. In a rotary engine, a pair of cylinders arranged side by side, a revoluble piston disk forming a division wall between the two cylinders and provided with openings for the passage of steam, a piston wing carried by the disk and having portions projecting into said cylinders, abutments coacting with the wings, and means for controlling the admission of steam into the cylinders, the steam admitted to one passing directly under full pressure to the other and acting on both members of the piston wing.

3. In a rotary engine, a pair of cylinders arranged side by side and communicating with each other, a piston disk forming a division wall between the two cylinders and provided with steam passages extending therethrough, a wing carried by the piston and having portions projecting into both cylinders, a steam chest having valved ports for placing one or other of the cylinders in communication with the steam supply, and an exhaust port leading from one of said cylinders.

4. In a rotary engine, the combination with a pair of cylinders arranged side by side, of a piston disk forming a division wall between the cylinders and provided with openings for the passage of steam, a piston wing having portions projecting into both cylinders, annular ribs arranged centrally within the cylinders and forming a steam chest, abutments arranged to make contact with the annular ribs, ports leading through the ribs and disposed in one cylinder on one side of the point of contact of the abutment and rib, and in the second cylinder on the opposite side of said point of contact, valves for controlling said ports, and an exhaust port leading from one of the cylinders.

5. In a rotary engine, a pair of cylinders arranged side by side, a piston disk forming a division wall between the cylinders and provided with openings for the passage of steam, a piston wing carried by the disk and having members projecting into both cylinders, and means for admitting steam to one of the cylinders to act on both wing members in revolving the piston in one direction, and for the admission of steam to the second cylinder to act on both wing members in revolving the piston in the opposite direction.

6. In a rotary engine, a plurality of cylinders, a shaft extending therethrough, pistons carried by the shaft and provided with openings for the passage of steam, each of said cylinders having an annular rib, the spaces within the ribs being placed in communication with each other to form a practically continuous steam chest throughout the whole of the cylinders, and valved ports leading through said ribs.

7. In a steam engine, a plurality of sets of cylinders arranged side by side, pistons disposed in said cylinders, a shaft carrying the pistons, a continuous annular steam chest extending centrally through all of the pistons of one set and common to all of the cylinders, and valved ports leading from the steam chest to the several cylinders.

8. In a rotary engine, a plurality of cylinders arranged side by side, a shaft extending through the cylinders, pistons carried by said shaft and provided with openings for the passage of steam, annular ribs formed in each of the cylinders on lines concentric with the center of the shaft and forming a continuous steam chest for all of said cylinders, valved ports leading through the ribs, and abutments coacting with the pistons.

9. The combination in a rotary engine, of a plurality of cylinders arranged side by side, a shaft extending through the cylinders, annular ribs arranged in alinement with each other in the several cylinders and forming a continuous annular steam chest, ports leading through the ribs, wings carried by the pistons, abutments coacting with the pistons and provided with recesses to permit the passage of said wings, exhaust ports, valves controlling the ports, and a valve shifting mechanism common to all of said valves.

10. In a rotary engine, a plurality of pairs of cylinders arranged side by side, a piston disk forming a division wall between the cylinders of each pair and provided with openings for the passage of steam, annular ribs in each cylinder and forming a continuous annular steam chest, ports leading through the ribs, valves for controlling said ports, piston wings carried by said disks, the wings of one pair being diametrically opposed to the wings of the second pair, and abutments provided with recesses for the passage of said wings.

11. In a rotary engine, a plurality of cylinders arranged side by side, a shaft extending through the cylinders, pistons carried by the shaft, a continuous annular steam chest common to all of the cylinders and provided with ports for the passage of steam, piston wings carried by the disks, escape ports leading from less than the whole number of cylinders, valves controlling the ports from the steam chest and the escape ports, rods or stems connected to the valves, a cross bar to which all of the rods are connected, and means for operating said cross bar to effect simultaneous adjustment of all the valves.

12. In a rotary engine, the combination with a revoluble piston having a radial slot, of a piston wing having a continuous marginal groove, packing strips fitting in the groove at both sides and ends of the wing, packing members carried by the wing and movable in a direction diagonal thereof and provided with end flanges interfitting with correspondingly shaped portions at the ends of the packing strips, and springs tending to urge said members outward from the wing.

13. In a rotary engine, a radially slotted piston disk, a piston wing formed of a pair of plates having grooves for the reception of the walls of the radial slot, said plates being recessed and provided with a continuous marginal groove, packing strips fitting in said groove and provided with flanged end portions, springs seated in the recesses, and slidably mounted packing members bearing at one end on the springs and provided at their opposite ends with flanges interfitting with the flanges on the packing strips.

In testimony that we claim the foregoing as our own, we have hereto affixed our signatures in the presence of two witnesses.

OLE OLSEN GOSERUD.
OLE GOSERUD, Junior.

Witnesses:
JOHN JORGENSON,
H. B. HANSON.